United States Patent [19]

Watanabe

[11] Patent Number: 4,571,697

[45] Date of Patent: Feb. 18, 1986

[54] APPARATUS FOR CALCULATING PATTERN DISSIMILARITY BETWEEN PATTERNS

[75] Inventor: Takao Watanabe, Tokyo, Japan

[73] Assignee: Nippon Electric Co., Ltd., Tokyo, Japan

[21] Appl. No.: 453,867

[22] Filed: Dec. 28, 1982

[30] Foreign Application Priority Data

Dec. 29, 1981 [JP] Japan ................................ 56-210200

[51] Int. Cl.⁴ ............................................ G06F 15/20
[52] U.S. Cl. ................................. 364/561; 364/513.5; 381/43
[58] Field of Search ............... 364/560, 561, 562, 513, 364/513.5, 728; 381/42, 43

[56] References Cited

U.S. PATENT DOCUMENTS

| 3,816,722 | 6/1974 | Sakoe et al. ............................ 381/43 |
| 4,049,913 | 9/1977 | Sakoe ...................................... 381/43 |
| 4,059,725 | 11/1977 | Sakoe ...................................... 381/43 |
| 4,256,924 | 3/1981 | Sakoe ...................................... 381/43 |
| 4,286,115 | 8/1981 | Sakoe ...................................... 381/43 |
| 4,319,221 | 3/1982 | Sakoe ...................................... 381/43 |
| 4,384,273 | 5/1983 | Ackland et al. ....................... 381/43 |
| 4,403,114 | 9/1983 | Sakoe ................................... 364/513 |
| 4,446,531 | 5/1984 | Tanaka .................................. 364/728 |
| 4,467,437 | 8/1984 | Tsuruta et al. ........................ 381/43 |

Primary Examiner—Gary Chin
Attorney, Agent, or Firm—Sughrue, Mion, Zinn, Macpeak, and Seas

[57] ABSTRACT

Apparatus for calculating the distance between two patterns, each given in the form of time sequences of vectors, by using the distance between a feature vector of one pattern and a line segment connecting two feature vectors of the other pattern. The apparatus calculates the distance D representing the length of the line segment between two adjacent vectors $a_{i+1}$ and $a_i$ of a first time sequence of vectors, A. It also calculates the distance X and Y representing, respectively, the distance between the vector $a_{i+1}$ and a vector $b_j$, and the distance between the vectors $a_i$ and $b_j$, where the vector $b_j$ is a vector of the second time sequence of vectors, B. Processing units generate a distance signal Z representing the perpendicular distance from the vector $b_j$ to the line segment connecting adjacent vectors $a_{i+1}$ and $a_i$. Comparing the absolute value of the difference between the distance X and Y to the length of the line segment D determines a selection signal which selects one of the distances X, Y or Z as the most correct distance between the two patterns.

4 Claims, 7 Drawing Figures

APPARATUS FOR CALCULATING PATTERN DISSIMILARITY BETWEEN PATTERNS

BACKGROUND OF THE INVENTION

The present invention relates to an apparatus for calculating a pattern dissimilarity between two patterns given in the form of time sequences of feature vectors.

To calculate the pattern dissimilarity between two patterns which are given in the form of time sequences of feature vectors, it is necessary to calculate the distance between the vectors no matter how the two patterns correspond with each other on the time sequences. In general, the distance between one vector and another is calculated as the distance between a point and another point each corresponding to the respective vector in the vector space. When a continuously changing pattern, such as voice, is expressed in the form of a discrete time sequence of vectors, the dissimilarity between the two patterns often tends to be calculated at a greatly erroneous value even though the patterns are nearly identical.

The object of the present invention is to provide an apparatus which is capable of accurately calculating the dissimilarity between patterns.

According to the present invention, there is provided a calculating apparatus for calculating a dissimilarity between a first pattern and a second pattern each given by time sequences of vectors in which the distance calculation is performed by adopting a distance between a line segment connecting two points corresponding to adjacent vectors of the first pattern and a point corresponding to one vector of the second pattern. The calculating apparatus comprises means for calculating a distance between two adjacent vectors in a first time sequence of vectors corresponding to the first pattern in a vector space, means for calculating a distance between each of the two adjacent vectors in the first time sequence and a vector in a second time sequence of vectors corresponding to the second pattern in the vector space, and means for calculating a distance between the line segment connecting two points of vectors corresponding to the first pattern and the point of the vector corresponding to the second pattern, based on the calculated distances.

By the present invention, the calculation error conventionally derived when expressing an original continuous pattern as discrete time sequences for the distance calculation can be minimized.

PREFERRED EMBODIMENT OF THE INVENTION

First, to assist in a comprehension of the present invention, an example is given below of how to calculate a distance according to a prior art method. Feature vector sequences of two patterns to be compared are given by:

$$A = (a_1, \ldots, a_i, \ldots, a_I) \\ B = (b_1, \ldots, b_j, \ldots, b_J) \tag{1}$$

To calculate the dissimilarity between the two patterns A and B, the patterns on the two time sequences must be made to correspond with each other by some means. The simplest procedure for this purpose may be to employ the so-called linear normalization method. According to this method, the patterns A and B are linearly compressed to produce time-sequence patterns $A' (=(a'_1, \ldots, a'_M))$ and $B' (=(b'_1, \ldots, b'_M))$ of a length M. The dissimilarity (D (A, B)) between the patterns A and B is derived from the following equation.

$$D(A, B) = \sum_{m=1}^{M} d(a'_m, b'_m) \tag{2}$$

where d denotes the distance between the two feature vectors.

Figure 1:
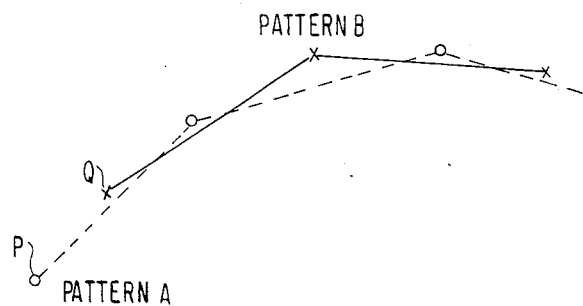
FIG. 1 shows two very similar patterns in which a prior art apparatus erronously derives a large dissimilarity therebetween.

The distance between patterns A and B is derived by utilizing the distance between two points (for example, P and Q in the case of FIG. 1) which correspond to feature vectors of the patterns A and B, respectively, as presented in the equation (2). It can happen that a large value distance is calculated depending upon the position-relationship between the two corresponding vectors, such as for the patterns shown in FIG. 1, although the two patterns are nearly the same, because the points to be compared to each other are apart from each other.

Figure 2:
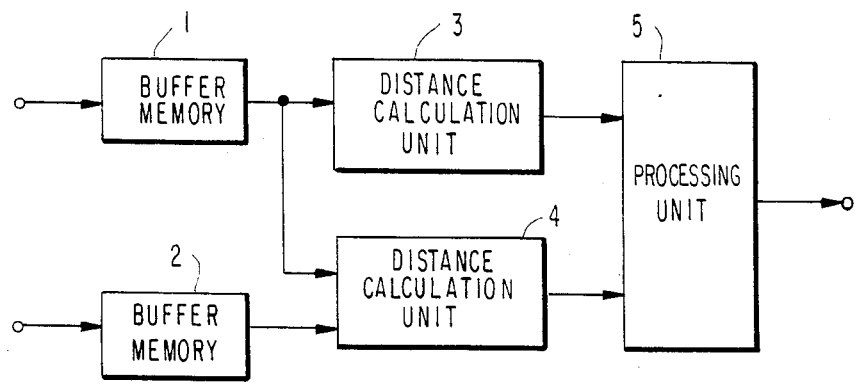
FIG. 2 is a diagram illustrating an embodiment of the present invention.

According to the present invention, the dissimilarity between the two patterns is calculated by using the distance between a feature vector of one pattern and a line segment connecting two feature vectors of the other pattern, thereby eliminating the above-described defect. An embodiment shown in FIG. 2 will be described hereinafter. The time sequences of the feature vectors of the two patterns to be compared are defined by equation (1). The time sequence of feature vectors corresponding to the pattern A is stored into an input buffer memory 1, and the time sequence of feature vectors corresponding to pattern B is stored in an input buffer memory 2. In this case, vectors $a_i$ and $a_{i+1}$ are stored in input buffer memory 1, and a vector $b_j$ is stored in input buffer memory 2. A distance calculation unit 3 calculates:

$$D = d(a_{i+1}, a_i) \tag{3}$$

where $d(a_{i+1}, a_i)$ represents the square of the Euclidean distance between the vector $a_{i+1}$ and the vector $a_i$ in the vector space.

A distance calculation unit 4 also calculates:

$$X = d(a_{i+1}, b_j) \tag{4}$$

$$Y = d(a_i, b_j) \tag{5}$$

and the output data D, X, and Y are supplied to a processing unit 5 which calculates the distance between the line segment $P(a_{i+1})P(a_i)$ and the point $P(b_j)$ in the vector space as mentioned below. Here, the indication $P(b_j)$ represents a point corresponding to the vector $b_j$ in the vector space.

When the square of the distance of the base of a perpendicular from the point $P(b_j)$ to the line $P(a_{i+1})P(a_i)$ is denoted by Z, and when $a_{i+1} \neq a_i$, the following relationship is satisfied:

$$Z = \frac{|a_{i+1} - b_j|^2 \cdot |a_i - b_j|^2 - [(a_{i+1} - b_j)'(a_i - b_j)]^2}{|(a_{i+1} - b_j) - (a_i - b_j)|^2} \quad (6)$$

where the mark (') represents the transposition of a vector.

By substituting equations (3), (4) and (5) in the equation (6), the following equation is obtained:

$$Z = (XY - \tfrac{1}{4}(X+Y-D)^2)/d \quad (7)$$

From the equation (7), the square e of the distance between the segment $P(a_{i+1})P(a_i)$ and the point $P(b_j)$ is defined as follows:

When $D=0$, $e=X$     (8)

When $D \neq 0$ and $-D \leq X - Y \leq D$, $e=Z$     (9)

When $D \neq 0$ and $X - Y < -D$, $e=X$     (10)

When $D \neq 0$ and $X - Y > D$, $e=Y$     (11)

Figure 3A:
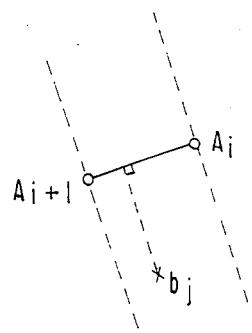
FIGS. 3(a), 3(b) and 3(c) are diagrams for explaining the concept of the distances calculated according to the present invention.
Figure 3B:
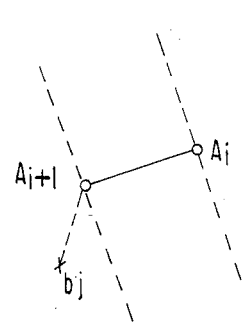
Figure 3C:
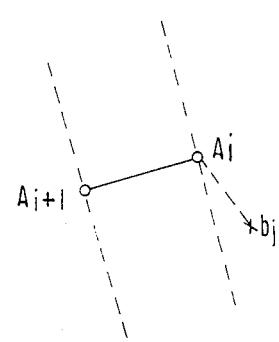

The conditions of equations (9), (10) and (11) represent the cases where the relationship between the position of the segment $p(a_{i+1}) P(a_i)$ and the point $P(b_j)$ correspond to diagrams shown in FIGS. 3(a), 3(b) and 3(c), respectively.

Figure 4:
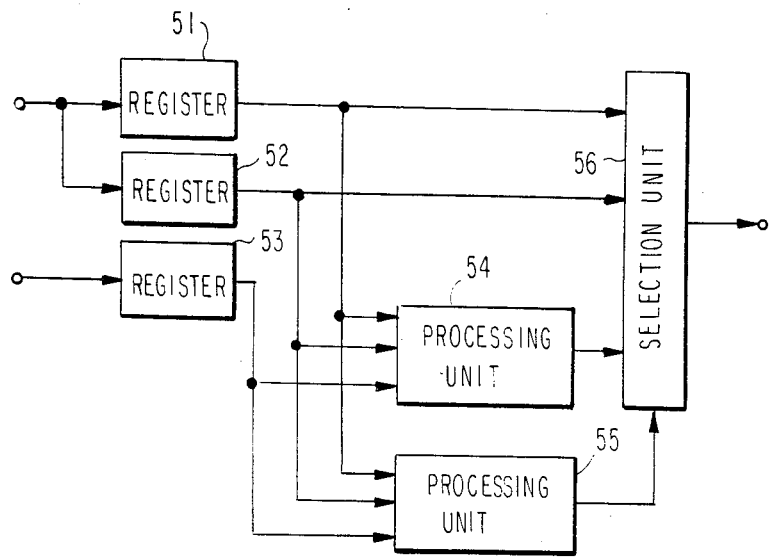
FIG. 4 is a block diagram of the processing unit 5 of the embodiment shown in FIG. 2.

FIG. 4 is a block diagram illustrating the construction of the processing unit 5, in which registers 51, 52 and 53 store the data X, Y and D, respectively, delivered from the processing units 3 and 4. According to the equation (7), a processing unit 54 calculates Z, in response to the input data D, X and Y. Processing unit 55 operates to determine which conditions should be selected from the equations (8) to (11) and outputs a selection signal to a selection unit 56. Depending upon the selection signal, the selection unit 56 outputs one of the data X, Y and Z.

Figure 5:
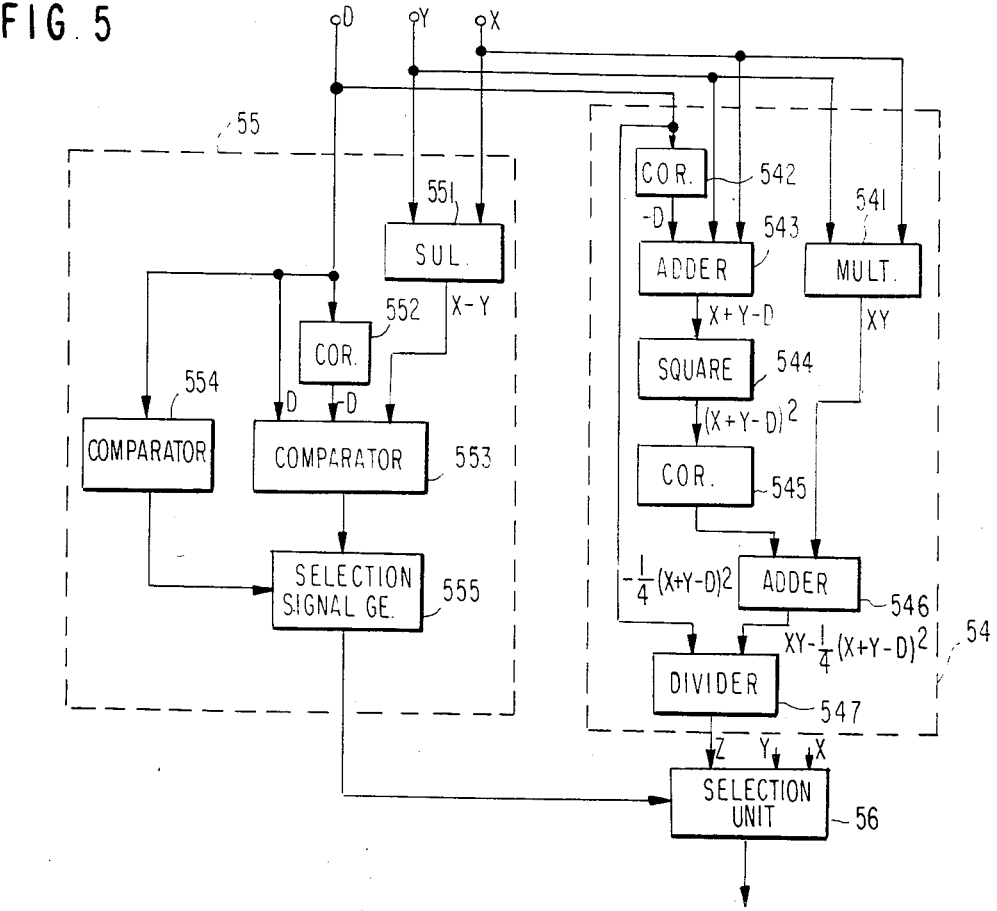
FIG. 5 is a block diagram of the processing units 54 and 55 shown in FIG. 4.

Referring to FIG. 5, a multiplication unit 541 calculates data (X Y) by the use of the data X and Y read out from the registers 51 and 52. A coefficient multiplication unit 542 multiplies the data D read out from the register 53 by the coefficient $-1$ to provide data $(-D)$. An adder unit 543 adds the data X and Y read out from the registers 51 and 52, and the data delivered from the coefficient multiplication unit 542 to provide data $(X+Y-D)$. A square calculation unit 544 squares the output data delivered by the adder unit 543 to provide data $(X+Y-D)^2$. A coefficient multiplication unit 545 multiplies the data delivered from the square calculation unit 544 by $(-\tfrac{1}{4})$ to provide data $-\tfrac{1}{4}(X+Y-D)^2$. An adder unit 546 adds the data delivered from the multiplication unit 541 and the data delivered from the coefficient multiplication unit 545 to provide data $(XY-\tfrac{1}{4}(X+Y-D)^2)$. A division unit 547 divides the data delivered from the adder unit 546 by the data D read out from the register 53, to provide data $(XY-\tfrac{1}{4}(X+Y-D)^2)/D$.

A subtraction unit 551 calculates data $(X-Y)$ from the data X and Y read out from the registers 51 and 52. A coefficient multiplication unit 552 multiplies the data D read from the register 53 by the coefficient $-1$ to provide data $(-D)$. A comparator 553 compares the output data $(X-Y)$ delivered from the subtraction unit 551 with the data D and $(-D)$. Consequently, the comparator 553 outputs the comparison result, i.e., the selection signal representative of one of the equations (9), (10) and (11). A comparator 554 discriminates whether the input data D delivered from the register 53 is zero or not. In response to the output of the comparator 554, a selection signal generator unit 555 outputs the selection signal from the comparator 553 when the output signal from the comparator 554 indicates $D \neq 0$, or outputs a selection signal which specifies that the data X should be selected by the selection unit 56 when the output signal from the comparator 554 indicates $D=0$.

An embodiment of the present invention was described above in detail. It will be understood that the vectors $a_i$ and $b_j$ may be located at any positions on the two time sequences of vectors that are being compared, the distance can be calculated after the positions have been fixed, and that the distance can be calculated for a variety of combinations of positions.

To compute the dissimilarity between two full patterns, for example, a DP matching process can be applied by adopting the distance obtained by the present invention. Such DP matching process is disclosed in for example, in the copending U.S. patent application Ser. No. 452,490 filed on Dec. 23, 1982 and corresponding to Japanese Patent Application Ser. Nos. 56-215666 and 56-215667, and having the priority date of Dec. 24, 1981.

What is claimed is:

1. An apparatus for determining a dissimilarity between a first pattern and a second pattern by adopting a distance between a line segment connecting two adjacent vectors of said first pattern and one vector of said second pattern, each of said first and second patterns being given in form of a time sequence of vectors, said apparatus comprising:

first memory means for storing said first pattern, including said two adjacent vectors;

second memory means for storing said second pattern; and calculating means, responsive to said first and second patterns stored in said first and second memory means, respectively, for calculating said distance, said calculating means comprising;

first means for calculating a first distance D between said two adjacent vectors in a first time sequence of vectors, said first time sequence corresponding to said first pattern;

second means for calculating second distances X and Y, respectively, between one of said two adjacent vectors in said first pattern and said one vector in a second time sequence of vectors, and between the other of said two adjacent vectors in said first pattern and said one vector in a second time sequence of vetors, said second time sequence correponding to said second pattern;

third means for calculating said distance between said line segment connecting two adjacent vectors of said first pattern and said one vector of said second pattern by calculating $Z(=XY-\tfrac{1}{4}(X+Y-D)^2)/D)$ in response to said first distance and said second distances to thereby determine a dissimilarity between said first and second patterns; and means for selecting one of said distances X, Y and Z, wherein said selecting means selects said distance X when $D=0$, said distance Z when $D \neq 0$ and $-D \leq X-Y \leq D$, said distance X when $D \neq 0$ and $X - Y < -D$, and said distance Y when $D \neq 0$ and $X - Y > D$.

2. An apparatus for determining a dissimilarity measure between a first pattern A and a second pattern B by adopting a distance between a line segment connecting two adjacent vectors of said first pattern A and one vector of said second pattern B, said first pattern A being given in the form of a first time sequence of vectors $\{a_1, a_2, ---, a_i, ---, a_I\}$ and said second pattern B being given in the form of a second time sequence of vectors $\{b_1, b_2, ---, b_j, ---b_J\}$ said apparatus comprising:

first memory means for storing said first pattern, including said two adjacent vectors;

second memory means for storing said second pattern; and calculating means, responsive to said first and second patterns stored in said first and second memory means, respectively, for calculating said distance, said calculating means comprising;

first means for calculating a distance $D(=d(a_{i+1}, a_i))$ between two adjacent vectors $a_{i+1}$ and $a_i$ of said first time sequence in a vector space;

second means for calculating a distance $X(=d(a_{i+1}, b_j))$ between said vector $a_{i+1}$ of said first time sequence and one vector $b_j$ of said second time sequence in the vector space, and for calculating a distance $Y(=d(a_i, b_j))$ between said vector $a_i$ of said first time sequence and said one vector $b_j$ of said second time sequence;

third means for calculating said distance between said line segment connecting said two adjacent vectors of said first pattern A and said one vector of said second pattern B by calculating $Z(=(XY - \frac{1}{4}(X+Y-D)^2/D)$ in response to said distances D, X and Y to thereby determine a dissimilarity between said first and second patterns; and means for selecting one of said distances X, Y and Z, wherein said selecting means selects said distance X when $D=0$, said distance Z when $D \neq 0$ and $-D \leq X - Y \leq D$, said distance X when $D \neq 0$ and $X - Y < -D$, and said distance Y when $D \neq 0$ and $X - Y > D$.

3. The apparatus as claimed in claim 2, wherein said third means for calculating a distance Z comprises; multiplier means for producing the product of the distances X and Y, first coefficient multiplication means for multiplying the distance D by the value $-1$, first adder means for adding the distances X, Y and $-D$, squaring means for squaring the value $(X+Y-D)$, second coefficient multiplication means for multiplying the value $(X+Y-D)^2$ by $(-\frac{1}{4})$, second adder means for adding the product XY to the value $-\frac{1}{4}(X+Y-D)^2$ and divider means for dividing the value $XY - \frac{1}{4}(X+Y-D)^2$ by the distance D to produce a value Z defined as $(XY - \frac{1}{4}(X+Y-D)^2)/D$.

4. The apparatus as claimed in claim 3, wherein said selecting means comprises; subtraction means for producing the difference between distance X and distance Y, first coefficient multiplication means for multiplying the distance D by the value $-1$, comparator means for comparing the value $X-Y$ with the distances D and $-D$ and for producing a selection signal indicating which of the relationships $-D \leq X - Y \leq D$, $X - Y < -D$ or $X - Y > D$ is true, and means for detecting whether the distance D is equal to zero or not, wherein said selecting means selects one of said distances X, Y and Z in response to said selection signal and an output of said detecting means.

* * * * *

UNITED STATES PATENT AND TRADEMARK OFFICE
CERTIFICATE OF CORRECTION

PATENT NO. : 4,571,697

DATED : February 18, 1986

INVENTOR(S) : Takao Watanabe

It is certified that error appears in the above-identified patent and that said Letters Patent is hereby corrected as shown below:

Column 5, Line 11 (Claim 2), "$b_j^j \ldots, b_J^j\}$" should read --$b_j^j \ldots, b_J^j\}$--

Signed and Sealed this

Twenty-ninth Day of July 1986

[SEAL]

Attest:

DONALD J. QUIGG

Attesting Officer

Commissioner of Patents and Trademarks